Sept. 14, 1926.
C. A. WEBSTER
ELECTRIC STORAGE BATTERY
Filed Jan. 14, 1925
1,600,083
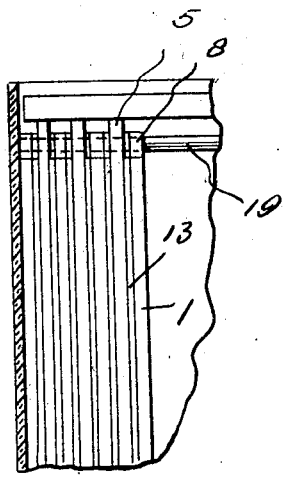
Fig. 1.
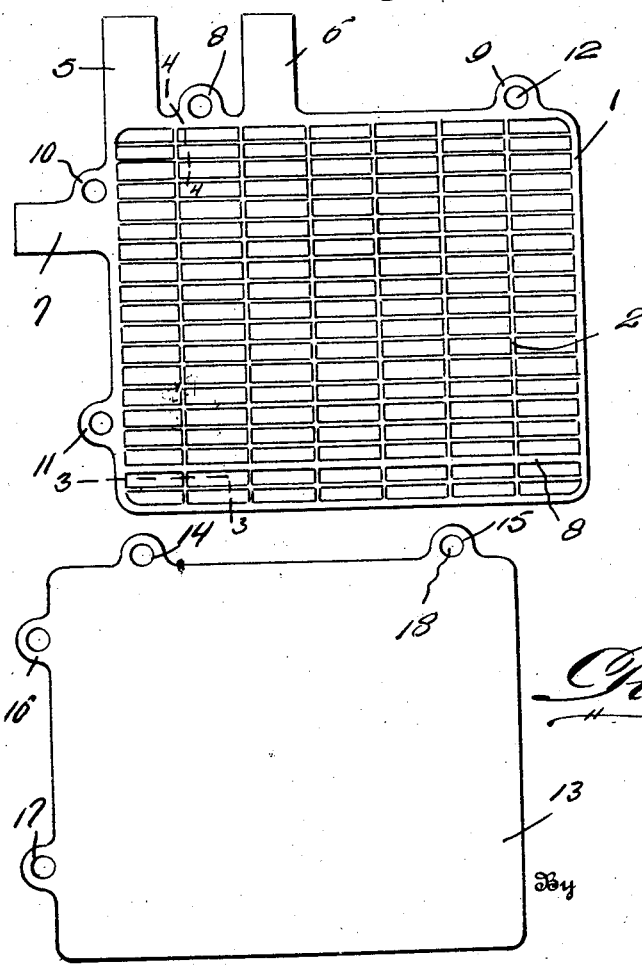
Fig. 2.
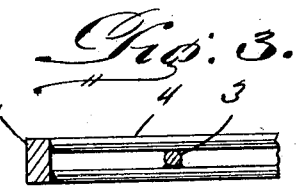
Fig. 3.
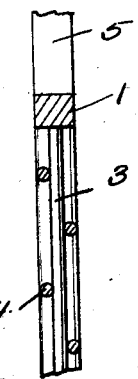
Fig. 4.
Fig. 5.
Inventor
C. A. Webster,
By
Clarence A. O'Brien
Attorney Patented Sept. 14, 1926.

1,600,083

UNITED STATES PATENT OFFICE.

CHARLIE A. WEBSTER, OF DORA, MISSOURI, ASSIGNOR OF ONE-HALF TO JASPER A. McKINNEY, OF WALNUT RIDGE, ARKANSAS.

ELECTRIC STORAGE BATTERY.

Application filed January 14, 1925. Serial No. 2,316.

This invention relates to improvements in electric storage batteries, and has for its principal object to provide a grid plate structure which is adapted to be carried in stock by battery repair places, the grid plate being of such construction as to accommodate its use to various makes of batteries, thus obviating the necessity of having to keep a large number of various kinds of storage battery grid plates in stock.

Another important object of the invention is to provide an electric storage battery wherein means is provided for locking the insulated separators in position between the grid plates, whereby vibration is reduced to a minimum, thus prolonging the life of the battery.

A further object of the invention is to provide an electric storage battery, whereby the plate may be cut down to the proper size depending upon the battery with which the same is adapted to be associated.

A still further object is to provide an electric storage battery of the above mentioned character, which is simple in construction, inexpensive, strong and durable, and further well adapted for the purposes for which it is designated.

Other objects and advantages of this invention will become apparent during the course of the following description.

In the accompanying drawings, forming a part of this specification, and in which like numerals designate like parts throughout the same:—

Figure 1 is a fragmentary view of a cell of an electric storage battery, showing the manner in which the plates and the insulated separators are arranged therein, further illustrating the locking means associated with the plates and the separators.

Figure 2 is a side elevation of one of the plates.

Figure 3 is a sectional view, taken approximately on the line 3—3 of Figure 2.

Figure 4 is a sectional view, taken approximately on the line 4—4 of Figure 2, and Figure 5 is a front elevation of one of the separators.

In the drawing, wherein for the purpose of illustration is shown the preferred embodiment of my invention, the numeral 1 designates a grid plate which forms a part of the present invention, the grid work thereof being indicated generally at 2, and the same includes the vertically extending and horizontally disposed circular rods 3 and 4 respectively.

Formed on the upper edge of the plates 1, are the posts 5 and 6 respectively. The post 5 is formed at a point adjacent the side edge of the plate, while the post 6 is arranged inwardly from the post 5. The purpose of this arrangement is to provide a means whereby the plate may be adapted to be used with batteries of certain makes wherein the posts of the plate of the battery which are to be repaired are located, at the same distance with respect to the side edge of the plate, as either of the posts formed on the plate 1, it being understood, of course, that either of the posts 5 or 6 is to be cut off, depending upon which of the posts is to be used.

For the purpose of accommodating a still further make of electric storage battery, a post 7 extends outwardly from the side edge of the plate 1, as clearly illustrated in Figure 2. A heavy rib 8 is formed in the plate 1, adjacent the bottom edge thereof, and the purpose thereof is to provide a means whereby the plate may be cut off at the rib 8, so that when the plate is placed in the cell with the edge on which the post 7 is formed disposed at the top of the cell, the rib 8 will form one of the side edges of the inverted plate, it being also understood that when the post 7 is used, the other posts 5 and 6 are cut off.

The plate is further provided on its upper edge with the ears 8 and 9, the same being arranged adjacent the respective side edges of the plate. A similar pair of ears 10 and 11 are formed on the side edge of the plate, from which extends the post 7. Each of the ears is provided with an opening, such as is shown at 12, and the purpose thereof will be presently described.

The separator which is adapted to be interposed between the positive and negative plates comprises the member 13, which is preferably formed of wood, although any other suitable insulated material may be substituted therefor. One of the faces of the separator 13 is corrugated in the usual manner, and the corrugated face is adapted to be disposed adjacent the positive plate of the storage battery. Formed on the upper edge of the insulated separators 13 are the ears 14 and 15 respectively, and a similar pair of ears 16 and 17 are formed on the side edge of the separator. Each of the ears provided on the separator is provided with an aperture 18. The ears 14 and 15 are adapted for cooperation with the ears 8 and 9, while the ears 16 and 17 cooperate with the ears 10 and 11, depending upon the arrangement of the grid plate and the separators in the cells of the battery. When either of the posts 5 and 6 formed on the upper edge of each plate is used, the ears and the post 7 on the side edge of each of the plates is cut off flush with the side edge of the plate and also the apertured ears 16 and 17 on each of the separators is cut off, so that the side edges of the plates and separators will be properly supported in the cell of the battery adjacent the respective sides of the same. The purpose of the apertured lugs is to provide a means for receiving a locking rod, such as is shown at 19, each rod being preferably formed of rubber.

With the parts arranged as shown in Figure 1, the separators 13 are arranged between the negative and positive plates, it being understood, of course, that both of the plates are raised or otherwise secured to the head members in the manner well known in the art. The locking rods 19 cooperating with the apertured lugs on the plate will prevent the vibration of the separators and thereby hold the active material on the positive plates against being removed therefrom, thus prolonging the life of the battery. Furthermore, the provision of the round bars 3 and 4, which form the grids of each of the plates will hold the active material in an efficient manner.

The provision of a plate construction of the above mentioned character enables the battery repair man to repair old plates in various makes of batteries, without having to keep in stock the plates of the particular batteries which are to be repaired. One of these plates will suffice for four different makes of batteries, thus saving considerable expense in keeping the supply of new parts on hand. The plates are further of such construction as to enable the posts and lugs which are not to be used readily cut off without damaging the plates or affecting the active material.

While I have shown the preferred embodiment of my invention, it is to be understood that various changes in the size, shape, and arrangement of parts may be resorted to, without departing from the spirit of the invention, and the scope of the appended claims.

Having thus described my invention, what I claim is:—

1. In a plate for electric storage batteries, posts extending from the adjacent side edges of the plate at predetermined places, certain of said posts adapted to be cut off to accommodate the plate in a storage battery.

2. In a plate for electric storage batteries, posts extending from the adjacent side edges of the plate at predetermined places, apertured ears formed on the adjacent side edges of the plate, certain of the posts and the apertured ears being adapted to be cut off to accommodate the plate in a storage battery.

In testimony whereof I affix my signature.

CHARLIE A. WEBSTER.